US012700947B2

(12) United States Patent
Teng et al.

(10) Patent No.: US 12,700,947 B2
(45) Date of Patent: Aug. 4, 2026

(54) SYSTEM AND METHOD FOR SIGNAL OPTIMIZATION ADJUSTMENT BASED ON DIFFERENT HEAT SOURCE INFORMATION

(71) Applicant: Super Micro Computer, Inc., San Jose, CA (US)

(72) Inventors: Wanfen Teng, San Jose, CA (US); Yi-Min Yu, New Taipei City (TW); Jason Yeh, New Taipei City (TW); Chao-Lung Wei, New Taipei City (TW); Fan-Cheng Huang, New Taipei City (TW); Yi-Wen Su, New Taipei City (TW); Ting-Chu Yeh, New Taipei City (TW); Mei-Yi Huang, New Taipei City (TW)

(73) Assignee: Super Micro Computer, Inc., San Jose, CA (US)

( * ) Notice: Subject to any disclaimer, the term of this patent is extended or adjusted under 35 U.S.C. 154(b) by 12 days.

(21) Appl. No.: 18/735,950

(22) Filed: Jun. 6, 2024

(65) Prior Publication Data

US 2025/0062856 A1 Feb. 20, 2025

(30) Foreign Application Priority Data

Aug. 18, 2023 (TW) ................................. 112131230
Oct. 2, 2023 (TW) ................................. 112137701

(51) Int. Cl.
*H04L 1/14* (2006.01)
*H04L 1/00* (2006.01)
*H04L 25/03* (2006.01)

(52) U.S. Cl.
CPC ............ *H04L 1/0015* (2013.01); *H04L 25/03* (2013.01)

(58) Field of Classification Search
None
See application file for complete search history.

(56) References Cited

U.S. PATENT DOCUMENTS 6,606,191 B1 * 8/2003 Gerrish ................ H04B 10/296
359/341.4
9,564,151 B1 * 2/2017 Kunkel .................... G11B 5/17
10,115,702 B2 * 10/2018 Yu .......................... H10W 90/00
11,109,515 B1 * 8/2021 Nagarajan .......... H05K 7/20672
(Continued)

FOREIGN PATENT DOCUMENTS

TW 201407399 2/2014
TW I709103 11/2020

*Primary Examiner* — Mujtaba M Chaudry
(74) *Attorney, Agent, or Firm* — Beyer Law Group LLP

(57) ABSTRACT

The present disclosure provides a system for signal optimization adjustment based on different heat source information. The system includes a plurality of heat source measurers, a first system chip, a second system chip, an electrical interconnection, and a bit error risk evaluator. The first system chip includes a signal transmitter, and the second system chip includes a signal receiver. The second system chip provides an electrical characteristic state of the signal receiver, and a signal adjustment information of the signal transmitter and/or the signal receiver. The bit error risk evaluator performs a signal optimization adjustment for an electrical characteristic of the signal receiver according to the electrical characteristic state. The present disclosure further provides a method for signal optimization adjustment.

21 Claims, 12 Drawing Sheets

(56)          References Cited

U.S. PATENT DOCUMENTS

| | | | |
|---|---|---|---|
| 2001/0040720 A1* | 11/2001 | Gerrish | H01S 3/10013 |
| | | | 359/341.41 |
| 2005/0152413 A1* | 7/2005 | Chang | H01S 5/06216 |
| | | | 372/18 |
| 2007/0122148 A1* | 5/2007 | Welch | G02B 6/12004 |
| | | | 398/27 |
| 2008/0174856 A1* | 7/2008 | Matsuda | H01S 5/50 |
| | | | 359/337 |
| 2008/0226306 A1* | 9/2008 | Heffner | H04B 10/677 |
| | | | 398/202 |
| 2017/0220384 A1* | 8/2017 | Anderson | G06F 9/4893 |
| 2018/0083607 A1* | 3/2018 | Kanomata | G06F 1/04 |
| 2023/0197175 A1* | 6/2023 | Prakash | G11C 29/028 |
| | | | 365/185.22 |
| 2023/0393644 A1* | 12/2023 | Zlotnik | G06F 1/28 |
| 2024/0120890 A1* | 4/2024 | Jang | H03K 5/24 |

* cited by examiner

FIG.3

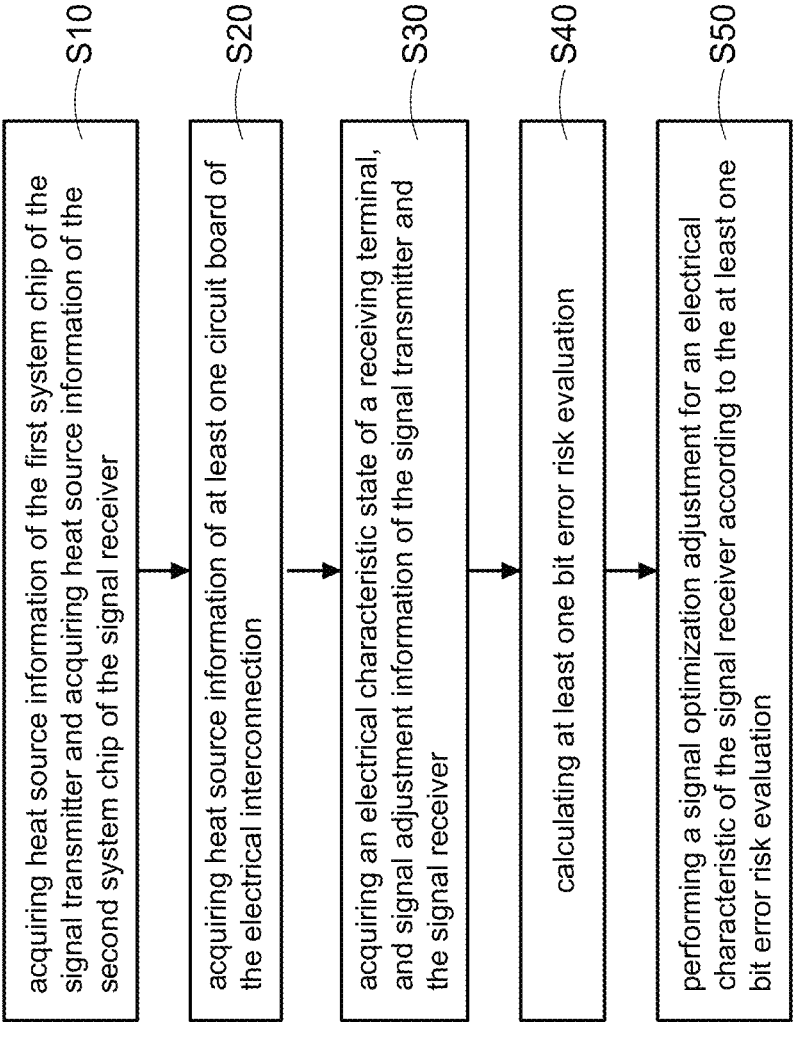

acquiring heat source information of the first system chip of the signal transmitter and acquiring heat source information of the second system chip of the signal receiver ⟋ S10 acquiring heat source information of at least one circuit board of the electrical interconnection ⟋ S20 acquiring an electrical characteristic state of a receiving terminal, and signal adjustment information of the signal transmitter and the signal receiver ⟋ S30 calculating at least one bit error risk evaluation ⟋ S40 performing a signal optimization adjustment for an electrical characteristic of the signal receiver according to the at least one bit error risk evaluation ⟋ S50

FIG.4

SYSTEM AND METHOD FOR SIGNAL OPTIMIZATION ADJUSTMENT BASED ON DIFFERENT HEAT SOURCE INFORMATION

CROSS-REFERENCE TO RELATED APPLICATIONS

This application claims the benefit of Taiwan Patent Application No. 112131230 filed on Aug. 18, 2023, and Taiwan Patent Application No. 112137701 filed on Oct. 2, 2023. The entire contents of each of the above-noted Taiwan patent applications are incorporated herein by reference in their entirety.

BACKGROUND OF THE DISCLOSURE

Technical Field

The present disclosure relates to a system and a method for signal optimization adjustment, and more particularly to a system and a method for signal optimization adjustment based on different heat source information.

Description of Related Art

The statements in this section merely provide background information related to the present disclosure and do not necessarily constitute prior art.

With human needs for digital life, many new wired or wireless technologies continuously develops. Everything from personal handheld devices to servers in data centers is undergoing rapid upgrades and changes in response to large amounts of information, high speed, and high quality transmission.

The so-called digital communication is nothing more than the transmission of codes representing specific meanings by chips. These codes are transmitted from the transmitter to the receiver, and the higher the accuracy of signal reception, the higher the quality of the transmission. On the contrary, if the signal received at the receiver is inconsistent with the signal transmitted by the transmitter, causing the receiver to provide incorrect codes to the chip, it represents low-quality signal transmission. However, a low-quality transmission equipment or device cannot meet the rapidly changing trend of digital communications.

However, there are many physical or design factors that affect the transmission of signals, especially high-speed signals, between the chip at the transmitting terminal and the chip at the receiving terminal. These factors may cause the signal to be inconsistent at the receiving terminal and the transmitting terminal, such as noise and interference between signals. In addition, the physical changes caused by high temperature environment to materials will also affect the electrical transmission quality. However, the existing technology has not yet conducted sufficient research and discussion on this aspect of technology. Therefore, a technological to overcome or eliminate the impact of thermal effects to provide high-quality digital transmission is yet to be made.

Accordingly, the present disclosure proposes a system and method for signal optimization adjustment, and particularly refers to a new technology of a system and method for signal optimization adjustment based on different heat source information so as to focus on dealing with the electrical impact due to thermal effects, and then accurately evaluate the states of the heat source in the system environment and the changes in the heating characteristics of the signal channel, and adopt technical means to optimize the signal adjustment.

SUMMARY OF THE DISCLOSURE

An objective of the present disclosure is to provide a system for signal optimization adjustment based on different heat source information. The system includes a plurality of heat source measurers, a first system chip, a second system chip, an electrical interconnection, and a bit error risk evaluator. The plurality of heat source measurers acquire heat source information of different components. The first system chip includes a signal transmitter. The second system chip includes a signal receiver. The electrical interconnection is internally connected to the first system chip and the second system chip, and the electrical interconnection includes at least one circuit board. The second system chip provides an electrical characteristic state of the signal receiver, and a signal adjustment information of the signal transmitter and/or the signal receiver. The bit error risk evaluator performs a signal optimization adjustment for an electrical characteristic of the signal receiver according to the electrical characteristic state.

Another objective of the present disclosure is to provide a method for signal optimization adjustment based on different heat source information. The method includes steps of: acquiring heat source information of a first system chip comprising a signal transmitter and heat source information of a second system chip comprising a signal receiver by a plurality of heat source measurers in a system; acquiring heat source information of an electrical interconnection comprising at least one circuit board internally connected to the first system chip and the second system chip; acquiring an electrical characteristic state of the signal receiver provided by the second system chip, and a signal adjustment information of the signal transmitter and/or the signal receiver; calculating at least one bit error risk evaluation; performing a signal optimization adjustment for an electrical characteristic of the signal receiver according to the at least one bit error risk evaluation.

Accordingly, the present disclosure proposes a system and method for signal optimization adjustment, and particularly refers to a new technology of a system and method for signal optimization adjustment based on different heat source information so as to focus on dealing with the electrical impact due to thermal effects, and then accurately evaluate the states of the heat source in the system environment and the changes in the heating characteristics of the signal channel, and adopt technical means to optimize the signal adjustment. Moreover, the system and method proposed by the present disclosure further consider the signal attenuation effect caused by thermal factors, and through full-channel thermoelectric characteristic evaluation, the impact of temperature on signal integrity can be more accurately determined so as to adjust and design the signal adjustment information (equalizer, pre-emphasis, de-emphasis, equalizer and/or retimer, repeater), or redesign the wiring to optimize the signal adjustment to ensure signal integrity and high-quality signal transmission.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows:

FIG. 3 is a system hardware diagram of the system for signal optimization adjustment based on different heat source information according to the present disclosure.

FIG. 4 is a flowchart of a method for signal optimization adjustment based on different heat source information according to the present disclosure.

DETAILED DESCRIPTION

Figure 1:
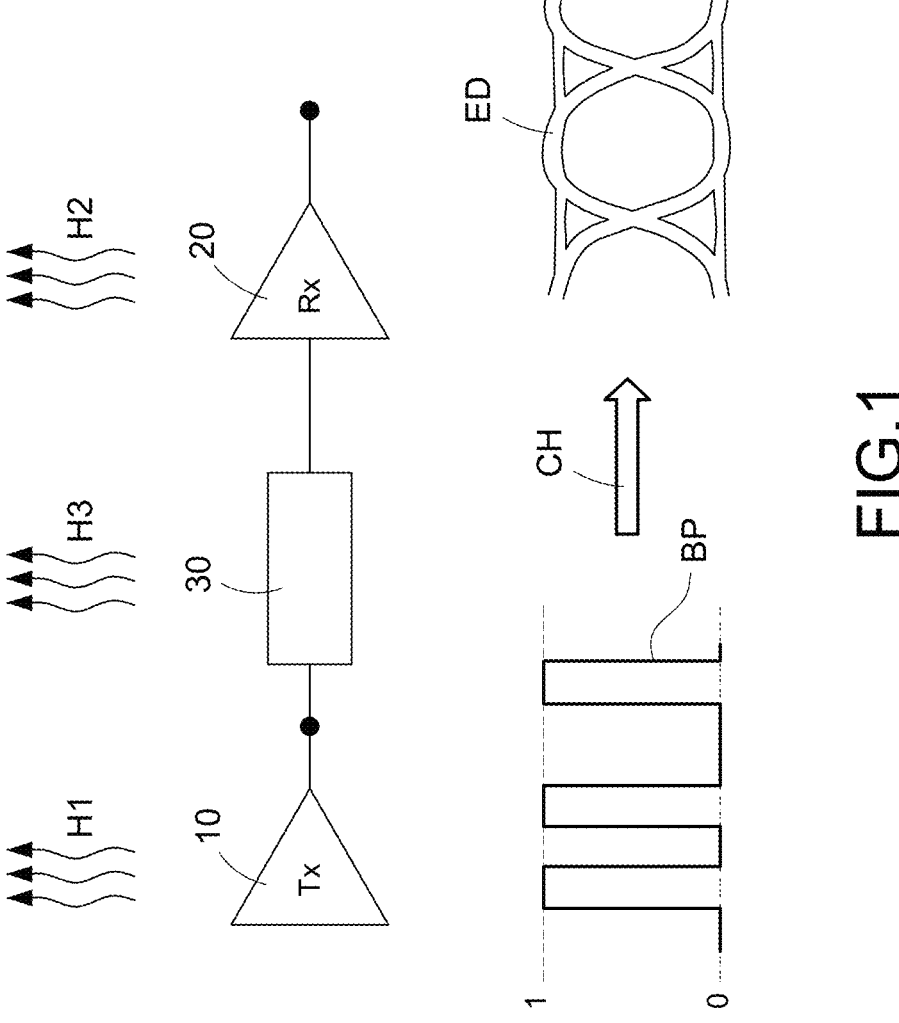
FIG. 1 is a system schematic diagram of a system for signal optimization adjustment based on different heat source information according to the present disclosure.

Reference will now be made to the drawing figures to describe the present disclosure in detail. It will be understood that the drawing figures and exemplified embodiments of present disclosure are not limited to the details thereof.

The implementation of the present disclosure is described below through specific examples, and those who are familiar with this technology can easily understand other advantages and effects of the present disclosure from the content disclosed in this specification. The present disclosure can also be implemented or applied through other different specific examples, and the details in the present disclosure can also be modified and changed based on different viewpoints and applications without departing from the spirit of the present disclosure.

The structures, proportions, sizes, and number of components shown in the drawings attached to the present disclosure are only used to match the content in the present disclosure, for those who are familiar with this technology to understand and read, and are not used to limit the implementation of the present disclosure. Any modification of structure, change of proportional relationship or adjustment of size shall fall within the scope covered by the technical content disclosed in the present disclosure, provided that it does not affect the effect and purpose of the present disclosure.

Please refer to FIG. 1, which shows a system schematic diagram of a system for signal optimization adjustment based on different heat source information according to the present disclosure. FIG. 1 illustrates a high-speed serial digital signal transmission line, and which includes three parts: a transmitting terminal Tx where a signal transmitter 10 is disposed, a signal channel CH, and a receiving terminal Rx where a signal receiver 20 is disposed. Please refer to FIG. 2, which shows a system block diagram of the system for signal optimization adjustment based on different heat source information according to the present disclosure. The system includes a first system chip 1, a second system chip 2, and an electrical interconnection 3 is internally connected to the first system chip 1 and the second system chip 2. In particular, the first system chip 1 includes the signal transmitter 10, the second system chip 2 includes the signal receiver 20, and the electrical interconnection 3 includes at least one circuit board 30. The so-called serial signal here refers to a serial deserialization (SerDes) technology commonly used in current high-speed signal protocols. However, the present invention is not limited to serial signals, that is, parallel signals are also applicable to the implement of the preset disclosure.

Figure 3:
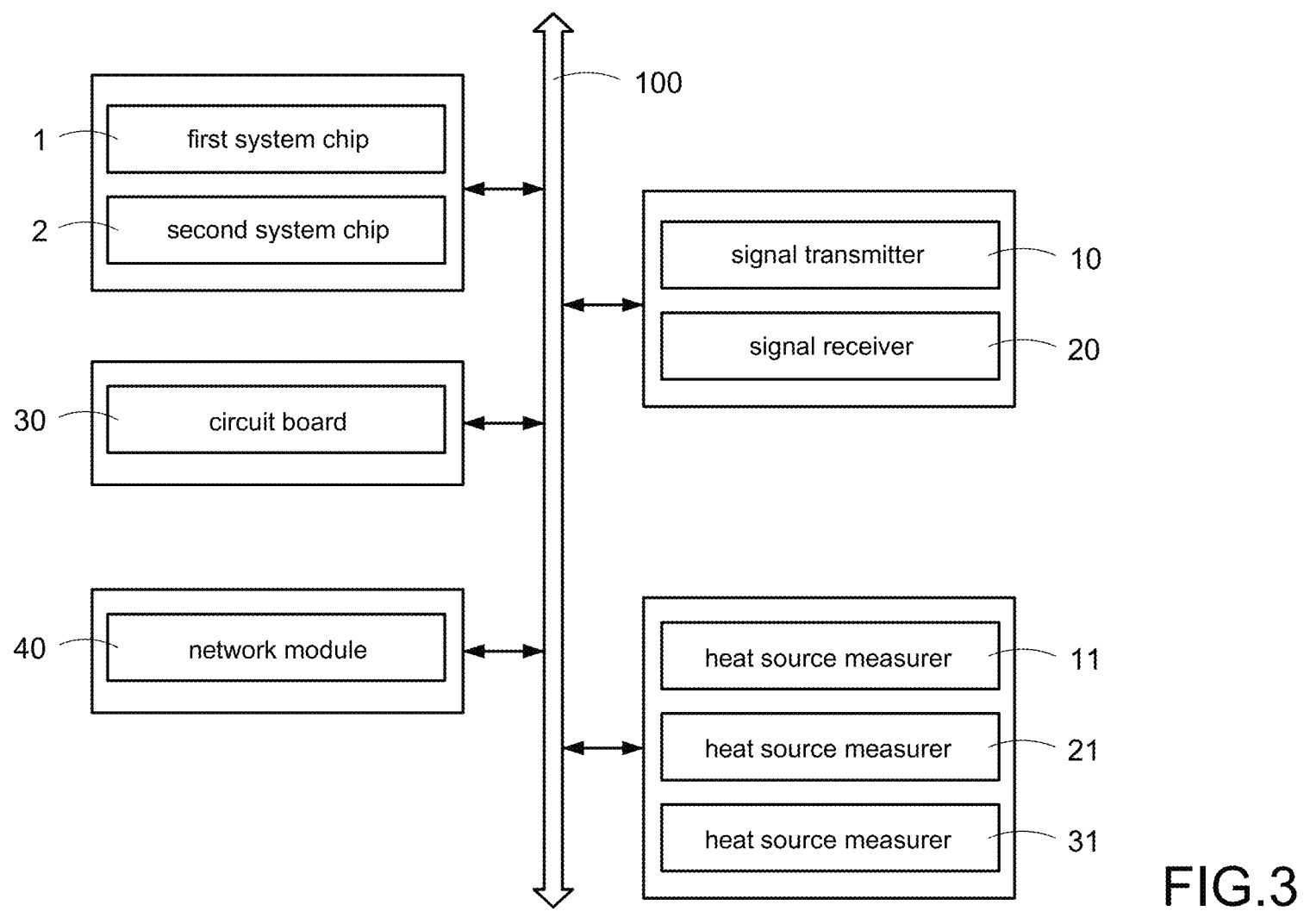

Please refer to FIG. 3, which shows a system hardware diagram of the system for signal optimization adjustment based on different heat source information according to the present disclosure. Each hardware (component, module, device, equipment, etc.) of the system, such as the system chips 1,2, the signal transmitter and receiver 10,20, the circuit board 30, heat source measurers 11,21,31, and so on, can provide communication, transmission, information exchange, etc. between each other through a bus 100.

As shown in FIG. 1, the signal transmitter 10 transmits the signal through the electrical interconnection 3 (or collectively referred to as the signal channel CH), and is finally received by the signal receiver 20. In particular, the bit pattern BP transmitted by the signal transmitter 10 is represented by digital signals of logic 0 and 1 indicating voltage changes. For the signal received by the signal receiver 20, existing electrical characteristic problems such as slow rise time, intersymbol interference, attenuation loss, etc. can be determined. For example, by analyzing an eye diagram (ED), the quality of the received signal can be quickly evaluated. However, the eye diagram ED is only one of the methods for evaluating signal quality. Other evaluation methods based on the spirit of eye diagram ED, such as cross lines, area method, etc., or converting voltage, current, resistance, etc. into grade scores may be converted into various types of benchmark software tools, which can also be implemented.

Figure 2:
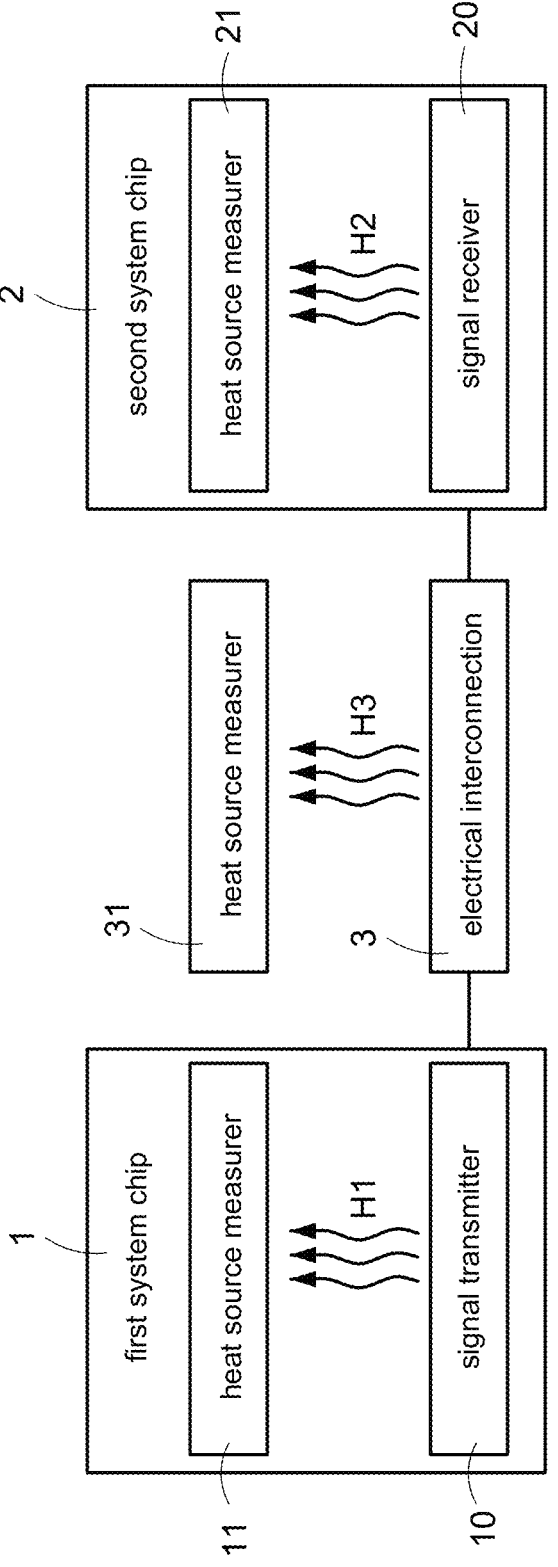
FIG. 2 is a system block diagram of the system for signal optimization adjustment based on different heat source information according to the present disclosure.

In addition, the system of in the present disclosure further includes a plurality of heat source measurers to acquire heat source information of each component mentioned above. Since different segments have different thermal effects during digital signal transmission, as shown in FIG. 1 and FIG. 2, the plurality of heat source measurers include at least one heat source measurer 11 disposed in the first system chip 1 and at least one heat source measurer 21 disposed in the second system chip 2. In particular, the heat source measurer 11 acquires the heat source information H1 of the first system chip 1, and the heat source measurer 21 acquires the heat source information H2 of the second system chip 2. In addition, the heat source measurer 31 acquires the heat source information H3 of the circuit board 30. In particular, the heat source measurer can be, but is not limited to, a thermal sensing component, a thermometer, a thermal imaging camera, etc., used to acquire the temperature of the component or the thermal imaging information of the component. The so-called thermal sensing component is not limited to a single means of sensing temperature. Equivalent methods of acquiring thermal information, such as impedance information, conversion of voltage and current, or time changes of a specific material parameter, can all be used as methods of observing temperature. Therefore, the heat source measurer defined in the present disclosure is not limited to general thermal-sensing technology, as long as it can provide physical thermal information, it should be included in the present disclosure.

For digital signal transmission, measurement of electrical characteristics is the most fundamental requirement in circuit design. In particular, the common electrical characteristic measurements include an impedance measurement and an S-parameter measurement. A characteristic impedance is the most basic electrical parameter in circuit design. The impedance is usually measured using a time domain reflectometer (TDR) or a vector network analyzer (VNA) with appropriate probes, mainly for a single-ended and differential impedance testing. The so-called measurement in the present disclosure does not only refer to the use of instruments for measurement. In fact, in the signal transmission between chips, the changes in the electrical characteristics of the signal from the transmitting terminal to the receiving terminal can be measured or calculated even inside the hardware system. The real-time measurement or calculation can provide the hardware system with real-time signal adjustment information. The system chip has such an observation or adjustment mechanism, which is an indispensable and important function on current advanced chips.

The mentioned-above S parameter is an observation of frequency domain characteristics, which is one of the basic electrical parameters in circuit design. The S parameter is usually expressed in the form of two ports or four ports, the most commonly used are an insertion loss, a dielectric constant (Dk), a loss tangent (Df), a return loss, a voltage standing wave ratio (VSWR), a far-end crosstalk (FEXT), a near-end crosstalk (NEXT), a signal-to-noise ratio (SNR), an integrated crosstalk noise (ICN), an integrated ratio (ICR), and so on. S-parameters are usually measured using a vector network analyzer with appropriate probes, connectors, or fixtures. Such parameters are not limited to directly acquire information from inside the chip. Further, by measuring impedance information, voltage and current changes, etc., these electrical parameters can be indirectly converted to provide a basis for signal adjustment.

In addition, in digital signal transmission, in order to compensate for the signal loss and attenuation caused by the signal channel CH, the equalization technology is used at the transmitting terminal Tx and/or the receiving terminal Rx to compensate the signal in an active or passive manner. In particular, the equalizer at the transmitting terminal Tx is usually also referred to an emphasis, and the common technologies include a pre-emphasis, a de-emphasis, and an FFE (feed-forward equalizer). First, the signal to be transmitted is encoded, and then a high and low frequency energy ratio of the signal is adjusted through the pre-emphasis and/or the de-emphasis, and then the signal is raised to a standard voltage level through a transmitter buffer (Tx buffer), and then transmitted to the signal channel CH.

The common technologies for the equalizer at the receiving terminal include a CTLE (continuous time linear equalizer) and a DFE (decision feedback equalizer). When the signal enters the signal channel CH, it may be subject to some problems caused by, such as an intersymbol interference (ISI), a crosstalk interference, a delay difference, a signal reflection, etc., resulting in poor signal quality. The signal with deteriorated quality first enters a receiver buffer (Rx buffer) and loads the correct load conditions. Afterward, the signal enters the CTLE to adjust the high and low frequency energy ratio of the lossy signal, and then enters the DFE to use a convolution operation to restore the signal to a better quality. In particular, it may be not the most ideal to adjust the equalizer with a fixed-amplitude. In practice, it is necessary to provide an equalization parameter adjustment design in response to different channel transmission environments. It is worth mentioning that adjusting the equalizer with a fixed amplitude is not the most ideal. In practice, it is necessary to provide an equalization parameter adjustment design in response to different channel transmission environments.

In addition, in order to solve the problem of increased signal attenuation and reduced signal quality caused by increased signal transmission distance, which leads to data bit errors, a retimer and/or a repeater may usually be added between the signal channels CH. The retimer mainly includes two functions, one is to equalize the signal, and the other is to repair a data clock signal with deterministic or random jitter, and then output a clean signal to the back-end device for use. The repeater uses equalization or pre-emphasis technology to compensate and correct signal losses at the transmitting terminal and restore signal integrity at the receiving terminal.

In the present disclosure, the second system chip 2 provides an electrical characteristic state of the signal receiver 20 at the receiving terminal Rx, such as the impedance value, S parameter, voltage of the received signal, etc. of the signal receiver 20 can be used as an evaluation of the signal received by the signal receiver 20.

Moreover, the second system chip 2 provides signal adjustment information for the signal transmitter 10 and/or the signal receiver 20, such as providing information for adjusting the signal such as the equalizer of the transmitting terminal Tx and/or the equalizer of the receiving terminal Rx. For example, the original pre-emphasis value of the transmitting terminal Tx is-3.5 dB, the CTLE value of the receiving Rx is 8, and the DFE value is 0.035. In this condition, an eye height (EH) and an eye width (EW) of an eye diagram ED are 35.02 mV and 0.36 UI. Based on this, the S parameters of the signal channel CH can be calculated, and the direction of adjustment can be acquired.

Below, the meaning of the signal adjustment information is explained through example values as listed in Table 1 and Table 2.

TABLE 1

| room temperature states | P6 | P7 | P8 |
|---|---|---|---|
| R_EW (UI) | 0.435 | 0.362 | 0.388 |
| R_EH (mV) | 45.39 | 28.96 | 35.78 |
| R_IL (dB) | −25.45 | −25.45 | −25.45 |
| R_CTLE | 8 | 11 | 11 |
| R_DFE1 | 0.03906 | 0.02539 | 0.03516 |
| R_DFE2 | 0.00586 | 0.00000 | 0.00586 |
| R_DFE3 | 0.00195 | 0.00195 | 0.00391 |

TABLE 2

| high temperature states | P6 | P7 | P8 |
|---|---|---|---|
| A_EW (UI) | 0.387 | 0.290 | 0.341 |
| A_EH (mV) | 32.21 | 16.77 | 22.32 |
| A_IL (dB) | −28.45 | −28.45 | −28.45 |
| A_CTLE | 7 | 8 | 8 |
| A_DFE1 | 0.03516 | 0.01953 | 0.02539 |
| A_DFE2 | 0.00586 | −0.00195 | 0.00195 |
| A_DFE3 | 0.00195 | 0.00000 | 0.00195 |

Figure 11:
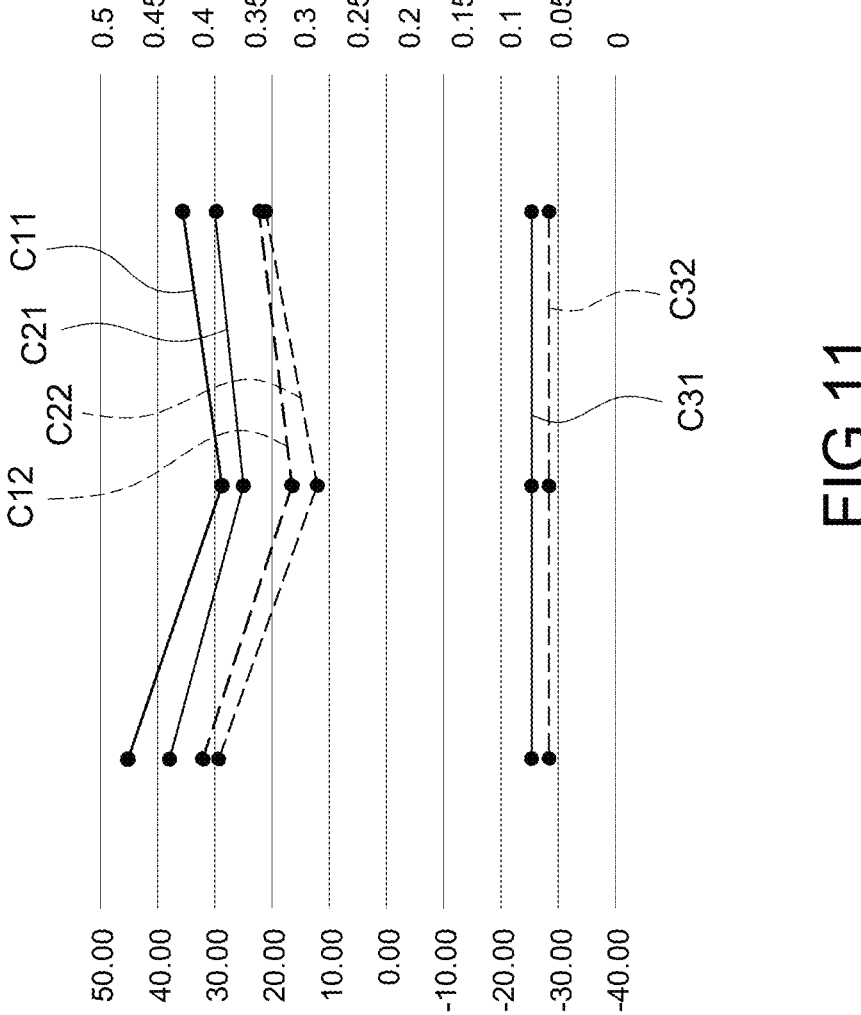
FIG. 11 is a signal adjustment information table of the system for signal optimization adjustment based on different heat source information according to the present disclosure.

According to the values listed in Table 1 (room temperature states) and Table 2 (high temperature states), it can be obviously seen that the performance of eye height and eye width under high temperature is worse than that under room temperature. In addition, the attenuation of the entire channel at high temperature is greater than that of the entire channel at room temperature. Please refer to FIG. 11, the R_EW at room temperature shown in Table 1 is the eye width value corresponding to a curve C21, the R_EH is the eye height value corresponding to a curve C11, and R_IL is an entire channel attenuation corresponding to a curve C31. The A EW at high temperature shown in Table 2 is the eye width value corresponding to a curve C22, the A_EH is the eye height value corresponding to a curve C12, and A IL is the entire channel attenuation corresponding to a curve C32. In addition, P6, P7, and P8 are signal adjustment information, i.e., EQ adjustment information. In particular, using the eye height and eye width to measure signal quality is one of many means, and converting the voltage and current represented by the signal into a specific range fraction, or into a step response, or into an impulse response, all fall within the technical scope of the present disclosure.

For example, at startup or at room temperature, the adjustment information may be an initial setting value based on different chip signals. Afterward, by a link training, the chip uses P7 as the basis for signal adjustment information. After the chip has been operating for a period of time, its performance in terms of eye height and width begins to decline due to temperature rise. In this condition, the signal adjustment is required after risk assessment and determine, P6 or P8 can be used as the basis for signal adjustment information since the performance of eye height and eye width of any one of them is relatively improved. As for selecting P6 or P8 as the basis for signal adjustment information, it is not to simply refer to the one with higher performance in terms of eye height or eye width. For example, for P6, although the performance of eye height and eye width is higher than that of P8, P6 is not necessarily selected as the basis for signal adjustment information. Furthermore, it is still necessary to consider the parameters of the equalizer (CTLE, DFE) as a whole. In other words, P8 may be selected because of its higher CTLE value (although its performance of eye height and eye width is lower). Therefore, if it is to only rely on the performance of eye height and eye width as the basis for signal adjustment information, and ignore other considerations (such as EQ component parameters, the effect of compensation for high and low frequency components), the meaning of signal adjustment information will be lost. Therefore, selecting the most appropriate signal adjustment information in response to different channel environments is the most important key.

Moreover, the system disclosed by the present disclosure further includes a bit error risk evaluator to evaluate whether to perform a signal optimization adjustment to the electrical characteristics of the signal receiver Rx. In other words, the present disclosure will still evaluate whether the received signal has been optimally adjusted. Once it is determined that there is no error in the received signal or there is a very low possibility of error (the risk of error is extremely low), no optimization adjustment is made to the received signal. On the contrary, if the received signal has a very high possibility of error, the received signal will be compensated according to the electrical characteristic state of the signal receiver 20 to achieve optimal signal adjustment.

In one embodiment, the bit error risk evaluator provides a risk feedback or a risk-free feedback according to the heat source information collected by the plurality of heat source measurers and according to a limit or warning temperature of each component. For example, it is assumed that a component has a warning temperature of 85° C. and a limit temperature of 95° C. When the heat source information H1,H2,H3 is lower than the warning temperature, the risk-free feedback is provided and no optimization adjustment is made to the received signal. On the contrary, if the heat source information H1,H2,H3 is higher than the limit temperature, the received signal needs to be optimized and adjusted. If the heat source information H1,H2,H3 is between the two temperatures, it is to evaluate whether to adjust the received signal based on the actual conditions of the channel transmission environment. The determination mechanism disclosed above is only one of various implementation embodiments. In fact, such determination logic can be more complex or simplified to meet the actual needs of different hardware systems.

In the current application, such a determination mechanism is a function of an algorithm, and it uses firmware to combine with system chips, memory or baseboard management controllers, and performs on the hardware system. Since the size of this algorithm will also affect the hardware capacity of the system chip, there is also an independent implementation in software.

Figure 5:
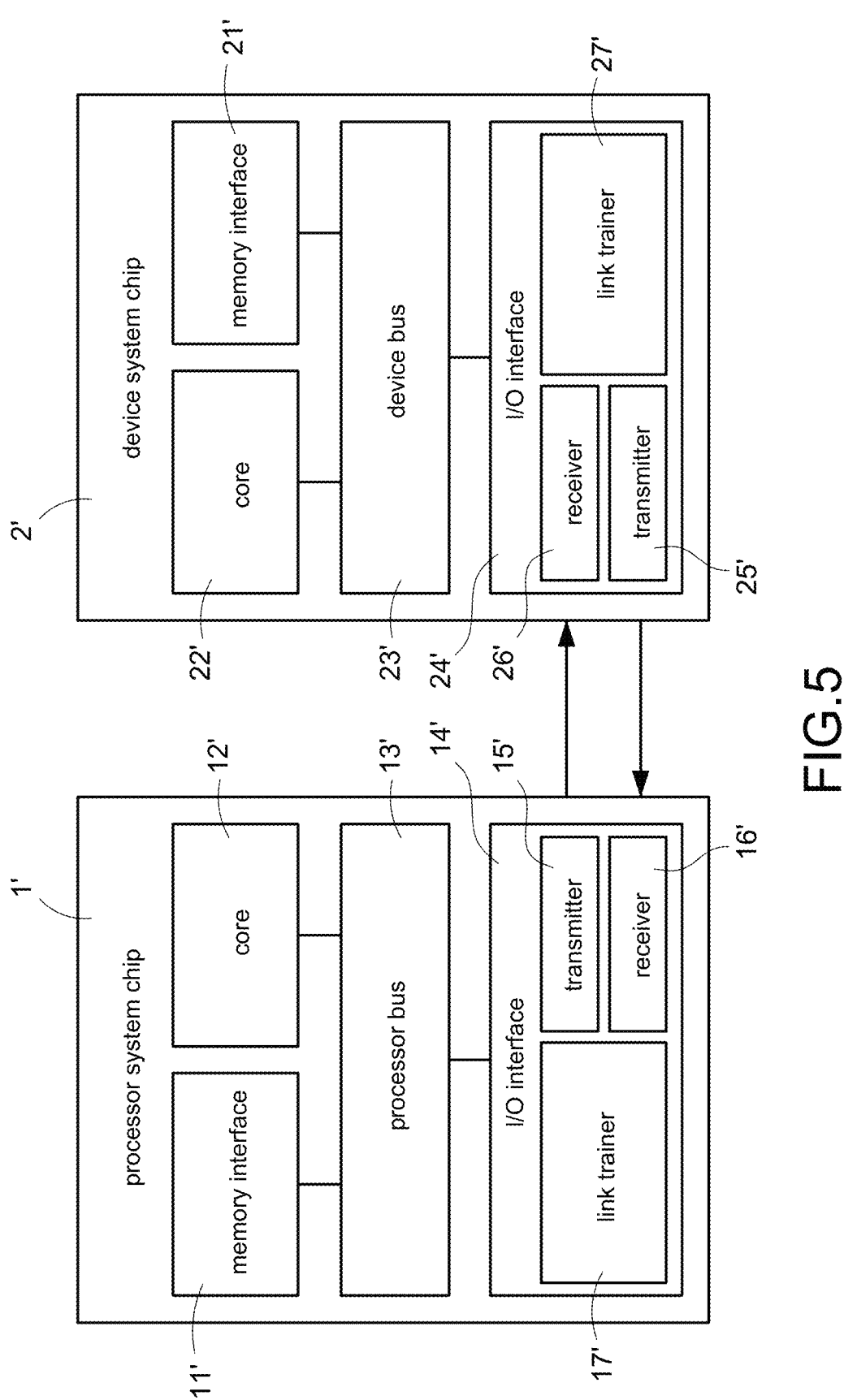
FIG. 5 is another system schematic diagram of the system for signal optimization adjustment based on different heat source information according to the present disclosure.

Please refer to FIG. 5, which shows another system schematic diagram of the system for signal optimization adjustment based on different heat source information according to the present disclosure. Corresponding to FIG. 2, the system shown in FIG. 5 includes two independent system chips, namely a processor system chip 1' and a device system chip 2'. Furthermore, each independent system chip has its own memory interface 11', 21', core 12', 22', processor bus 13', device bus 23', and I/O interface 14', 24'. In particular, the independent system chip 1' includes also a transmitter 15' and a receiver 16', and the device system chip 2' includes also a transmitter 25' and a receiver 26' to achieve bidirectional signal transmission between the processor system chip 1' and the device system chip 2'. Moreover, at least one of the processor system chip 1' and the device system chip 2' can provide a link trainer, that is, the I/O interface 14' of the processor system chip 1' can provide a link trainer 17' and/or the I/O interface 24' of the device system chip 2' can provide a link trainer 27'.

Figure 6:
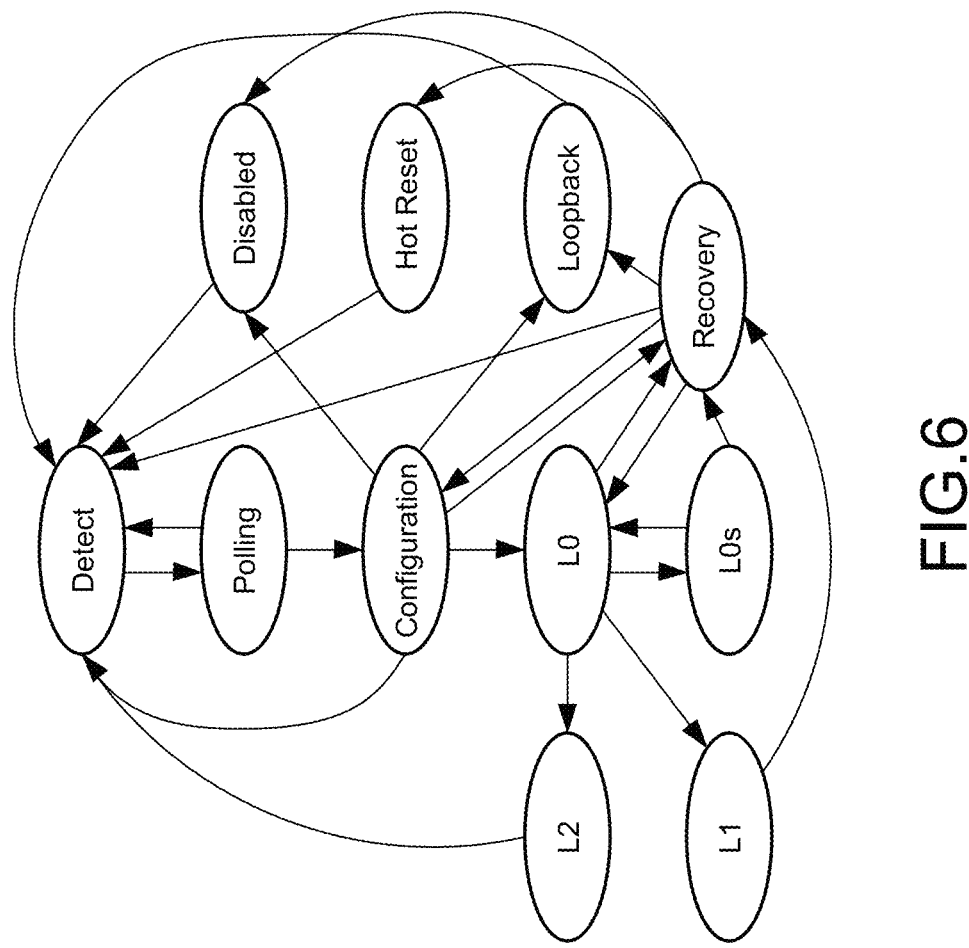
FIG. 6 is a schematic diagram of a link trainer of the system for signal optimization adjustment based on different heat source information according to the present disclosure.

Moreover, the present disclosure further discloses an advanced implementation embodiment. Taking the second system chip 2, namely the device system chip 2', as an example, it includes a link trainer. Please refer to FIG. 6, which shows a schematic diagram of a link trainer of the system for signal optimization adjustment based on different heat source information according to the present disclosure. FIG. 6 presents the link trainer in the form of a logical tree. The link trainer is responsible for link orientation and initialization, including the initialization process from power-on or reset to normal operating state (L0), and the low-power management states (L0s,L1,L2). During the link training process, the devices at both terminals send training sequence (TS) to exchange information to complete the configurations of link width, channel inversion, polarity reversal, negotiated rate, bit lock/symbol lock, speed switch, and balanced content.

The above-mentioned link trainer contains multiple states, and each state completes its own function. In the "Detect" state, the device detects whether there is a device on the other end of the link. In a "Polling" state, the bit lock and the symbol lock are implemented to confirm whether the channel is available. In a "Configuration" state, In the configuration (Configuration) state, numbers and path numbers are assigned to valid channels. In the normal operating state (L0) state, a transaction layer packet (TLP), data link layer packet (DLLP), and a physical layer sequence sets can be transmitted and received. L0s, L1, and L2 are all low-power states, and entering the low-power states when the link has no packet to send can reduce the power consumption of the link. When an error occurs in the link, it can enter a "Recovery" state from the normal operating state L0 to perform link retraining. In addition, in a "Loopback" state, the devices at both terminals enter the test state. In addition, in a "Disable" state, a configured link is to be disabled. Moreover, a "Hot Reset" state causes the device to be hot reset.

The link trainer of the second system chip 2 provides the electrical characteristic state of the signal receiver 20 and the signal adjustment information of the signal transmitter 10 and the signal receiver 20. This type of link trainer also has various implementation forms. If a chip originally has a standard or previous link trainer, it may be a module or an independent function. In this condition, one embodiment is that the bit error risk evaluator is a function set attached to the link trainer, and it includes activation conditions or exclusion conditions for restarting link training between the signal transmitter 10 and the signal receiver 20, for transmitting signal adjustment instructions to at least one equalizer in the first system chip 1 and/or the second system chip 2, or at least one signal adjuster in the electrical interconnection 3.

In another embodiment, the second system chip 2 includes a link trainer for providing the electrical characteristic state of the signal receiver 20 and the signal adjustment information of the signal transmitter 10 and the signal receiver 20. In particular, the bit error risk evaluator is a function executed on the system (not a function set attached to the link trainer), which is used to evaluate at least one equalizer in the first system chip 1 and/or the second system chip 2 or transmit signal adjustment instructions to at least one equalizer in the first system chip 1 and/or the second system chip 2, or at least one signal adjuster in the electrical interconnection 3.

In addition to having pre-emphasis, de-emphasis and FFE at the transmitting terminal Tx, and having CTLE and DFE equalizers at the receiving terminal Rx, the system may also include at least one signal adjuster in the electrical interconnection 3, for example, a retimer and/or a redriver have functions such as signal amplification and reduction, which contain signal adjustment information. This type of signal adjuster has a programmable adjustment port that can be controlled by the system chip or system hardware in the form of commands. Therefore, the electrical characteristics of the receiving terminal Rx can be optimally adjusted by adjusting the electrical characteristics of the at least one signal adjuster. During the design stage, the optimal adjustment of the signal can be achieved by adjusting the pre-emphasis, de-emphasis, equalizer and/or retimer, repeater, or by redesigning traces. After the actual system is powered on, the main method is to adjust the pre-emphasis, de-emphasis, equalizer and/or retimer, and repeater to achieve optimal signal adjustment. Furthermore, if there is an accelerator/acceleration card uploaded to the hardware system, the above-mentioned thermal analysis can be trained as an AI model through the accelerator. Moreover, the above-mentioned thermal analysis may also be provided through a thermal database preloaded in a storage device on the hardware system.

The foregoing embodiments disclose technical means for achieving the present disclosure in the form of firmware and hardware on a hardware system. In one embodiment, the electrical characteristics of the receiving terminal Rx are optimally adjusted through a console on the system. In particular, the console may be a software or a program of an operating system. By restarting the system, the signal adjustment combination of the signal transmitter 10 and the signal receiver 20 is updated to achieve the signal optimization adjustment. Restarting the system as described here may refer to system reset by the operating system (OS). In another embodiment, such as controlling the hot reset function of the link trainer to achieve retraining results, is also included in the implementation of the present disclosure.

In addition, the system of the present disclosure further includes a network module 40. In one embodiment, the network module 40 is used to connect to an external database, and the training model of the signal adjustment information is connected to the external database. The network module 40 refers to the training information updated in real time, and transmits the adjustment instructions of at least one equalizer or at least one signal adjuster in the system.

In another embodiment, the network module 40 is used to connect to the database of the external system structure combination. The information of the heat source measures 11,21,31 refers to the training model of the database adjustment of the system structure combination, generates heat source information H1,H2,H3 to provide the bit error risk evaluator, and performs a signal optimization adjustment for the electrical characteristics of the receiving terminal Rx according to the electrical characteristic states.

Please refer to FIG. 4, which shows a flowchart of a method for signal optimization adjustment based on different heat source information according to the present disclosure, and the method may be performed by, for example, but not limited to, a computer-readable medium. Also refer to FIG. 1 to FIG. 3 disclosed above, the method includes steps of: acquiring heat source information H1 of the first system chip 1 of the signal transmitter 10 and acquiring heat source information H2 of the second system chip 2 of the signal receiver 20 by a plurality of heat source measurers 11,21,31 in a system (step S10).

Afterward, acquiring heat source information H3 of at least one circuit board 30 of the electrical interconnection 3 internally connected to the first system chip 1 and the second system chip 2 (step S20). Afterward, acquiring an electrical characteristic state of a receiving terminal Rx provided by the second system chip 2, and signal adjustment information of the signal transmitter 10 and the signal receiver 20 (step S30). Afterward, calculating at least one bit error risk evaluation (step S40). Finally, performing a signal optimization adjustment for an electrical characteristic of the signal receiver 20 according to the at least one bit error risk evaluation (step S50).

Corresponding to the method content of the system for the signal optimization adjustment according to different heat source information disclosed in FIG. 1 to FIG. 3, please refer to the corresponding content in the specification of the present disclosure, and the repeated content will not be described again.

The method of the present disclosure further includes a step of: acquiring a signal adjustment information of at least one signal adjuster, and optimally adjusting the electrical characteristics of the receiving terminal Rx by adjusting the electrical characteristics of the at least one signal adjuster.

In one embodiment, the calculation of the bit error risk evaluation includes collecting the heat source information H1,H2,H3 of these heat source measurers 11,21,31, and providing a risk feedback or a risk-free feedback according to a limit or warning temperature of each component.

In one embodiment, the second system chip 2 includes a link trainer. The method further includes steps of: acquiring an electrical characteristic state of the signal receiver 20 and the signal adjustment information of the signal transmitter 10 and/or the signal receiver 20 by the line trainer, and sending an instruction of signal adjustment to at least one equalizer in the first system chip 1 and/or the second system chip 2 or to at least one signal adjuster of the electrical interconnection 3, or activating a link training between the signal transmitter 10 and the signal receiver 20.

Figure 12:
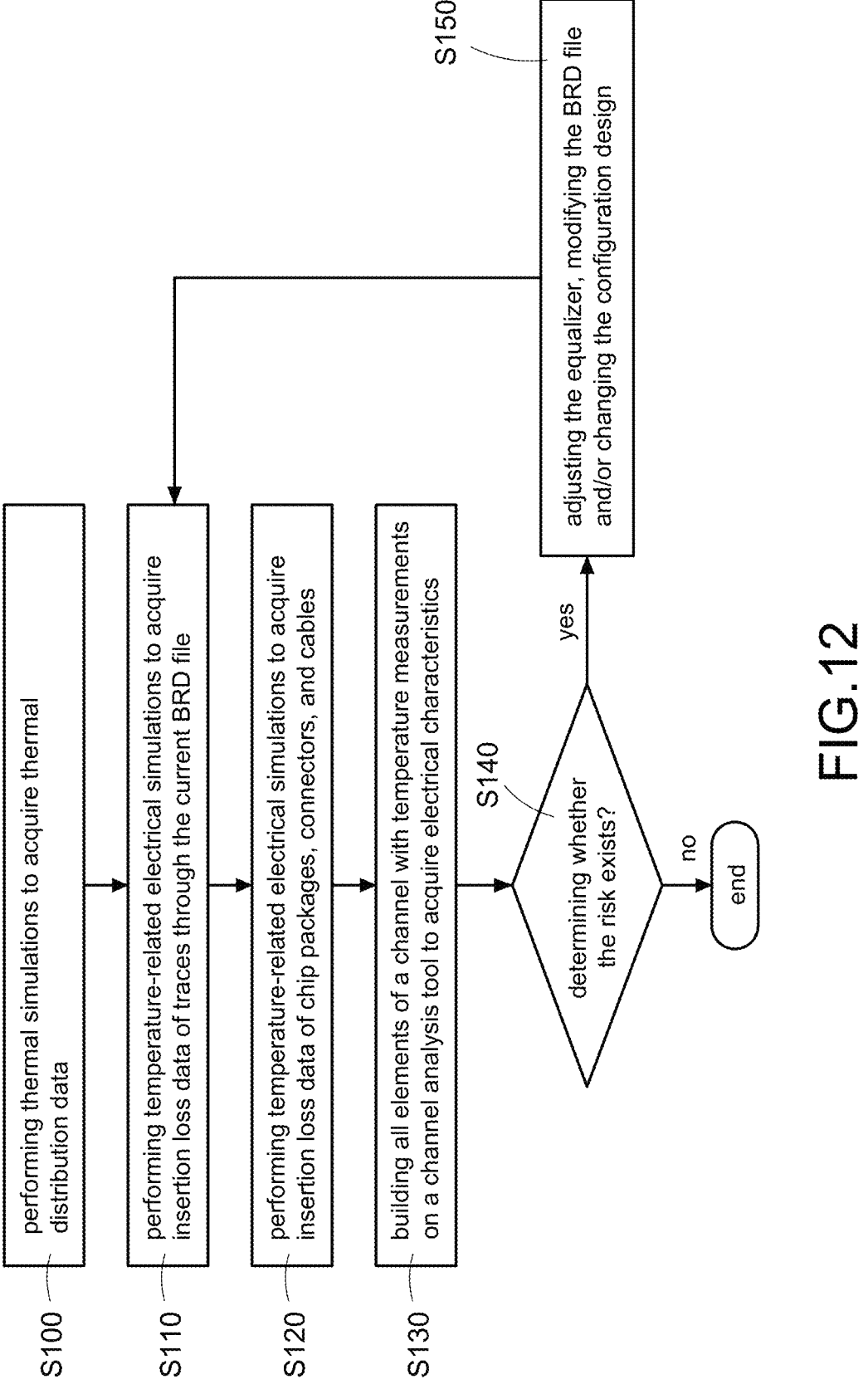
FIG. 12 is another flowchart of the method for signal optimization adjustment based on different heat source information according to the present disclosure.

Please refer to FIG. 12, which shows another flowchart of the method for signal optimization adjustment based on different heat source information according to the present disclosure. The method is an independent method related to simulation and design. The method includes steps of: performing thermal simulations to acquire thermal distribution data (step S100). Afterward, performing temperature-related electrical simulations to acquire insertion loss data of traces through the current BRD file (step S110). Afterward, performing temperature-related electrical simulations to acquire insertion loss data of chip packages, connectors, and cables (step S120). Afterward, building all elements of a channel with temperature measurements on a channel analysis tool to acquire electrical characteristics (step S130). Afterward, determining whether the risk exists (step S140). In the determination of step S140, if there is no risk, the method ends. On the contrary, in the determination of step S140, adjusting the equalizer, modifying the BRD file and/or changing the configuration design if the risk exists (step S150). Afterward, returning to step S110 and performing step S110 and subsequent steps again.

Following the above-mentioned independent methods related to simulation and design, the method disclosed in the present disclosure further includes a step of: defining system structure and component information from geometry and material files. The system structure and component information includes component information of the first system chip 1, the second system chip 2, and the circuit board 3, and system structure information they constitute. Alternatively, the system structure and component information further includes one or a plurality of cables in the circuit board 30. These geometry and material file may be a computer aided design (CAD) file or an industrial drawing file format ASCII. Afterward, initializing heating conditions of each component and heat-flow conditions of the system chassis. These heat-flow conditions include boundary conditions and can further form an independent setting file. These heat flow conditions include boundary conditions. In addition, an independent setting file can be formed. According to the above-mentioned geometry and material files and/or heat-flow condition files, a mesh file or equivalent node matrix data file is generated. In particular, the content of the mesh file is to construct the heat distribution state in a customized space in three-dimensional coordinates. Also, it can perform finer meshing for the region with higher temperature gradient, thereby helping to make the thermal analysis concrete and in-depth. In addition, the content of the node matrix data file constructs the heat distribution state through node information in rows and columns, and can provide heat vectors as heat source input.

As technology evolves, the mesh file or equivalent node matrix data file also has other formats to reduce meshing of geometry to avoid creating too complex and large mesh files. A current mainstream and more reliable implementation method is to use an energy matrix algorithm to generate files with mesh less. Therefore, heat source analysis data files can be generated through mesh files or equivalent node matrix data files. The heat source analysis data file includes heat source information H1,H2,H3 of the first system chip 1, the second system chip 2, and the circuit board 3, alternatively includes heat source information of one or a plurality of cables. In particular, the heat source analysis data files can be generated by the finite volume method or a finite element method so that the bit error risk evaluation can optimize the signal adjustment of the electrical characteristics of the receiving terminal Rx. In one embodiment, the signal optimization adjustment is to adjust one or a plurality of impedance matches in geometry and material files. In another embodiment, the signal optimization adjustment is to adjust one or a plurality of trace lengths in geometry and material files.

Figure 10:
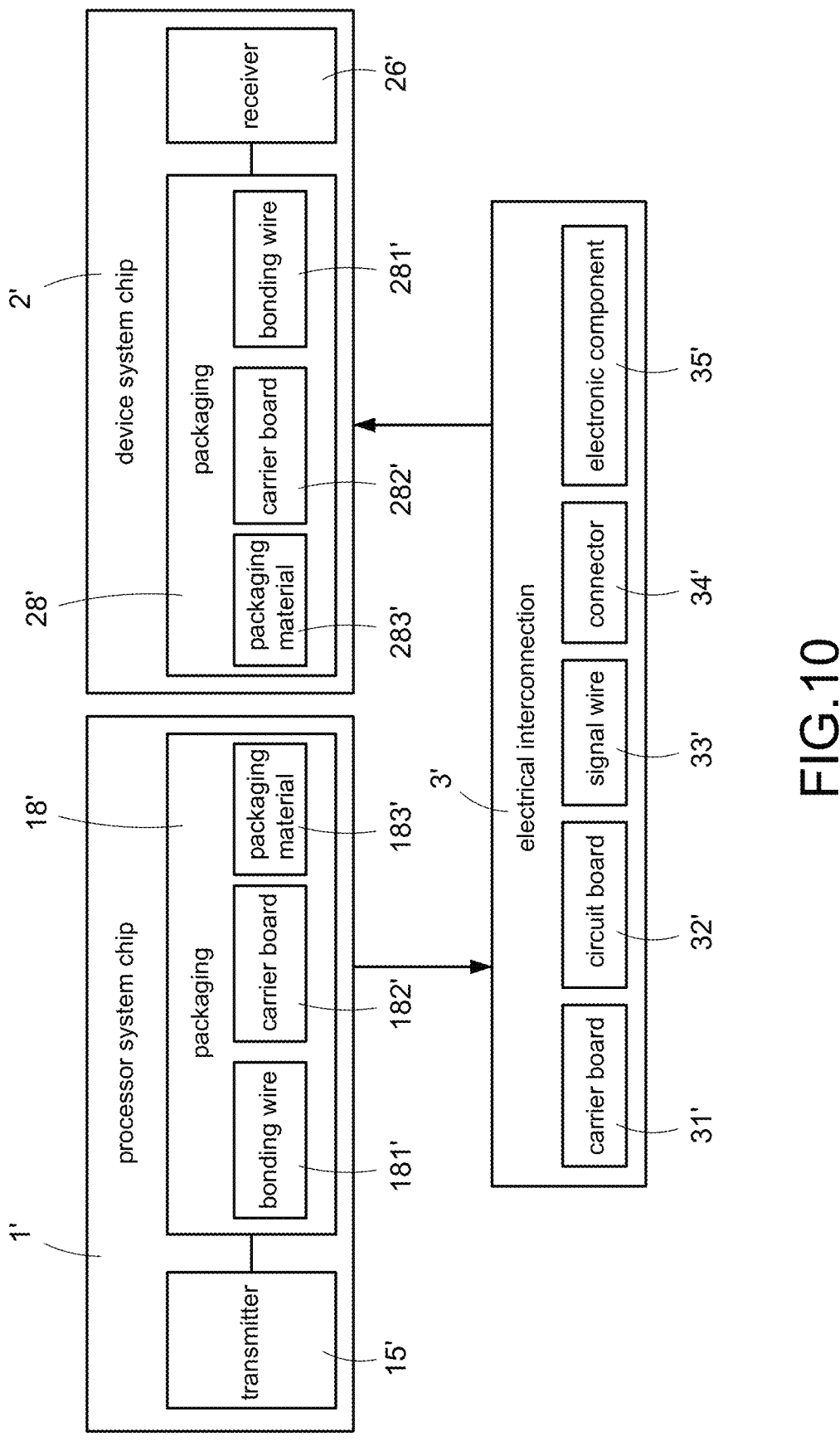
FIG. 10 is a channel block diagram of the system for signal optimization adjustment based on different heat source information according to the present disclosure.

Furthermore, performing an electrical simulation engine of a thermoelectric analysis. The electrical simulation engine includes the electrical characteristic states of the thermoelectric coupling of one or a plurality of chip package segments, and then generates electrical characteristic states based on the thermoelectric coupling of different heat sources in individual segments, including the transmitting terminal segment, the channel segment, and the receiving terminal segment (or the above segments may be further divided into finer plurality of segments). Therefore, this is used to calculate the electrical characteristic state of the receiving terminal Rx provided by the second system chip 2 and the signal adjustment information of the signal transmitter 10 and/or the signal receiver 20. Please refer to FIG. 10, which shows a channel block diagram of the system for signal optimization adjustment based on different heat source information according to the present disclosure. As shown in FIG. 10, the processor system chip 1' (corresponding to the first system chip 1 shown in FIG. 2), the device system chip 2' (corresponding to the second system chip 2 shown in FIG. 2) and a multi-segment signal channel composed of electrical interconnection 3' are disclosed in the form of a block diagram. In addition, the processor system chip 1' includes a transmitter 15' and a packaging structure 18', wherein the packaging structure 18' generally includes a bonding wire 181', a carrier board 182', and a packaging material 183'.

Similarly, the device system chip 2' includes a receiver 26' and a packaging structure 28', wherein the packaging structure 28' generally includes a bonding wire 281', a carrier board 282', and a packaging material 283'. The electrical interconnection 3' includes, but not limited to, a carrier board 31', a circuit board 32', a signal wire 333, a connector 34', an electronic component 35' or a combination thereof. In particular, the electronic component 35' is, for example but not limited to, a retimer and/or a redriver, or a signal switch IC. Broadly speaking, when a signal is transmitted from the transmitter 15' until it is received by the receiver 26', the path that the signal passes through can be referred to a channel. Since the paths that signals pass through do not have the same characteristics (such as material characteristics, impedance characteristics, etc.), as mentioned above, the signal is transmitted from the transmitter 15', and then passes through the packaging structure 18' of the processor system chip 1', and then passes through the carrier board 31', the circuit board 32', the signal wire 33', the connector 34', the electronic circuit 35' of the electrical interconnection 3', and then passes through the packing structure 28' of the device system chip 2', and is received by the receiver 26'. During the signal transmission process, since the packaging structure 18', the carrier board 31', the circuit board 32', the signal wire 33', the connector 34', the electronic component 35', and the packaging structure 28' have different characteristics, any one of them may be regarded as a channel through which signals pass through different segments.

The above-mentioned segment information is not limited to being acquired by the same analysis process. In practice, the chip contains chip packaging information, which can be acquired by the chip supplier providing electrical parameters, thermal parameters, or electrical characteristic tables. The electrical interconnection includes cables (copper cables or optical fiber cables), which can be acquired by the chip supplier providing electrical parameters, thermal parameters, or electrical characteristic tables. This information can be stored in a memory or a storage device of the system hardware as mentioned above, or can be implemented by connecting to an external database through the network module 40.

Figure 7:
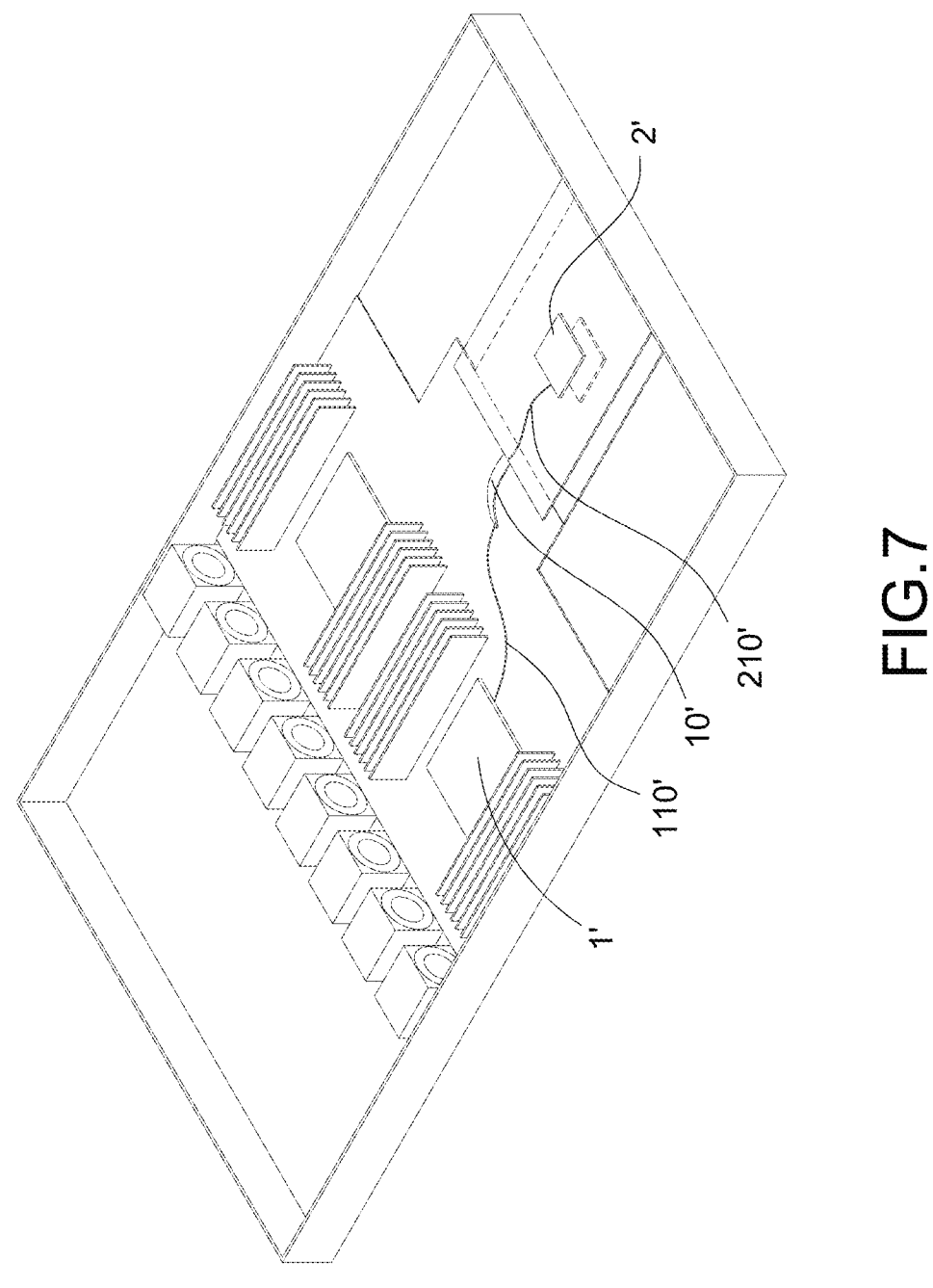
FIG. 7 is a schematic perspective view of the system for signal optimization adjustment based on different heat source information according to the present disclosure.

Moreover, please refer to FIG. 7, which shows a schematic perspective view of the system for signal optimization adjustment based on different heat source information according to the present disclosure, and also refer to FIG. 10. The processor system chip 1' (i.e., CPU) and the device system chip 2' are disposed inside accommodation space of the system, and a cable 10' (i.e., Cable) is further disposed inside the accommodation space, which means the cable 10' in the electrical interconnection 3'. The processor system chip 1' and the cable 10' are connected through a first trace 110', and the device system chip 2' and the cable 10' are connected through a second trace 210'. Therefore, when the signal is transmitted from (the transmitter 15' of) the processor system chip 1' to (the receiver 26' of) the device system chip 2', in addition to passing through the packaging structure 18' of the processor system chip 1' and the packaging structure 28' of the device system chip 2', it also passes through the cable 10'. Also since the signal passes through multi-segment signal channels, it causes distortion and attenuation in signal transmission.

Figure 8:
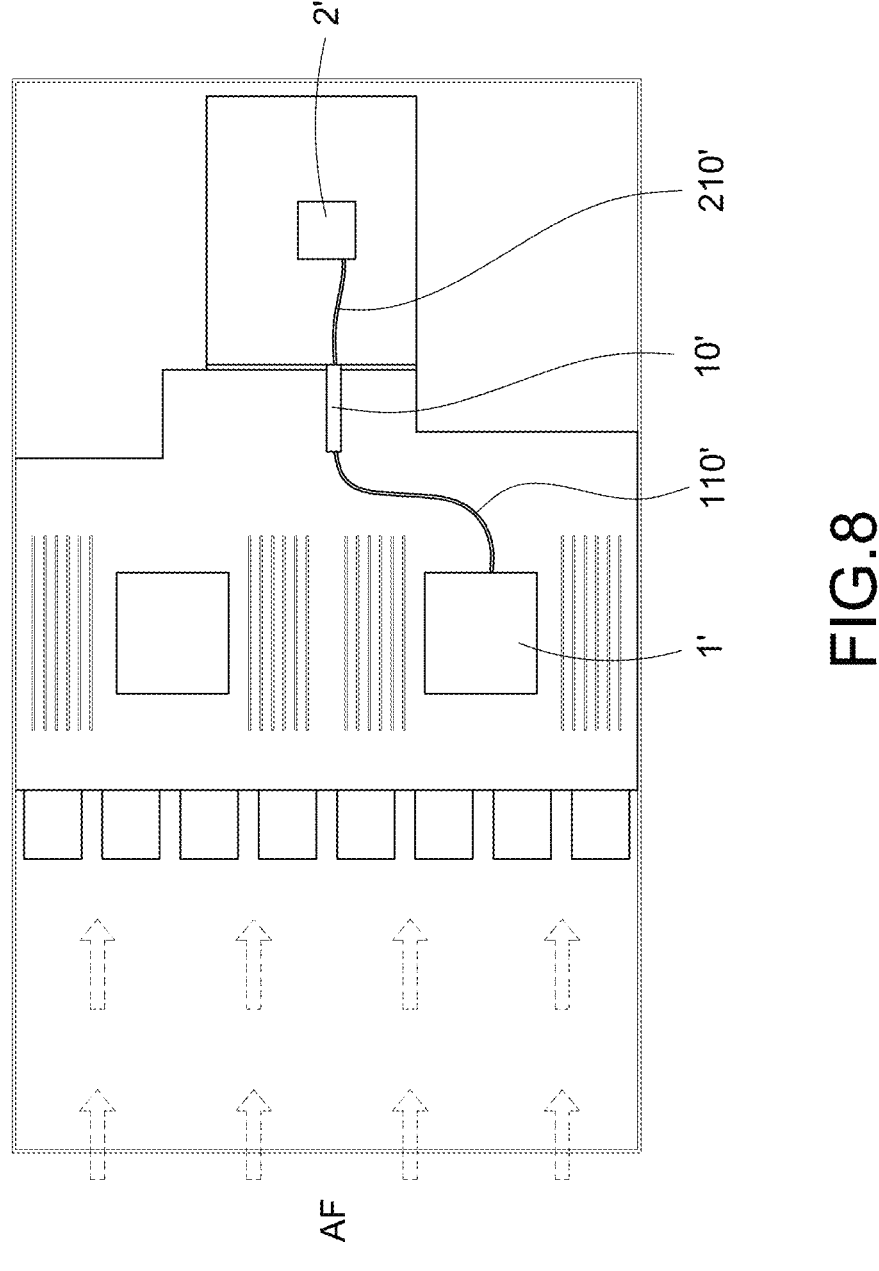
FIG. 8 is a schematic perspective top view of the system for signal optimization adjustment based on different heat source information according to the present disclosure.
Figure 9:
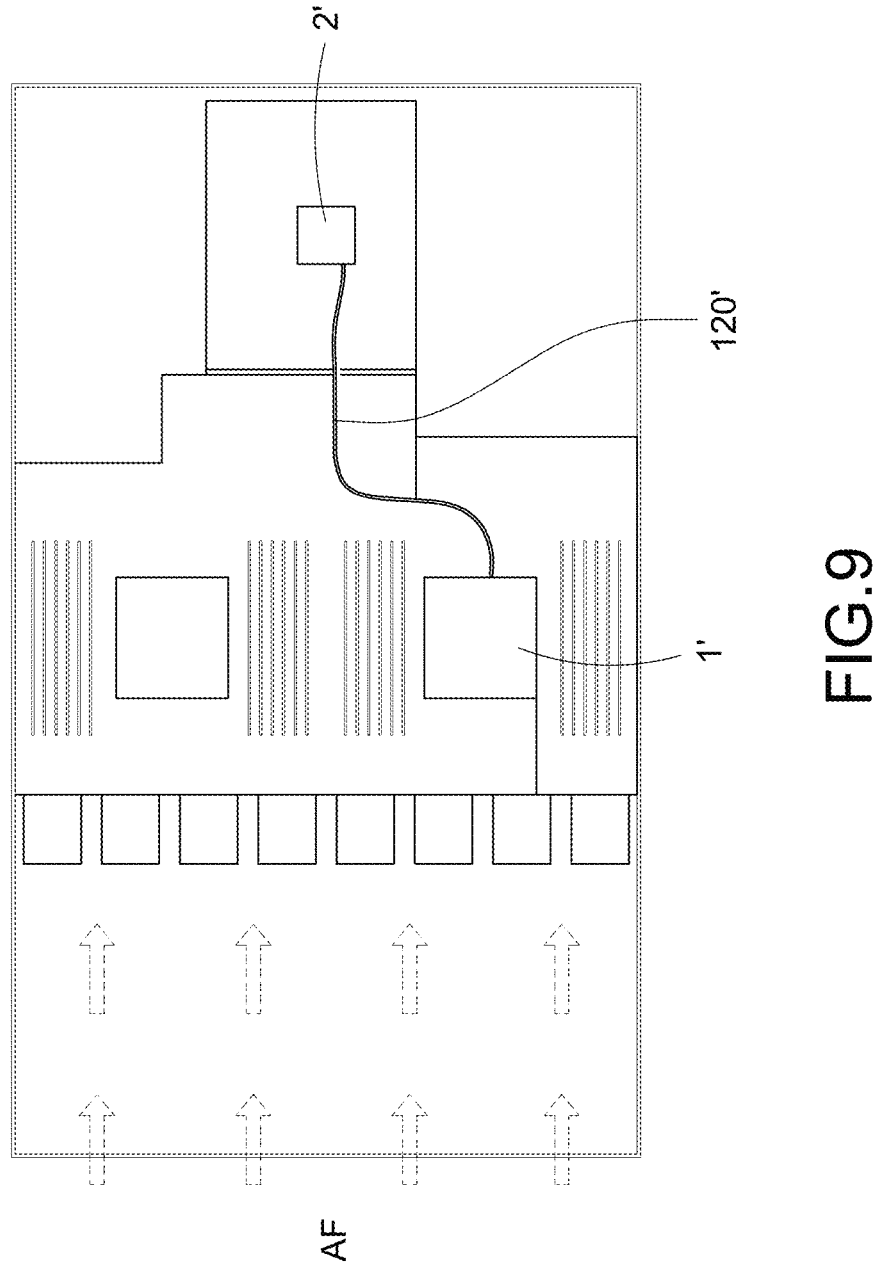
FIG. 9 is another schematic perspective top view of the system for signal optimization adjustment based on different heat source information according to the present disclosure.

Please refer to FIG. 8, which is a top view corresponding to FIG. 7. By introducing external airflow AF (for example, the introduction on the left side in the figure), the flowing airflow leads the heat generated by the heat source to the heat source measurer. Therefore, the heat source information of the processor system chip 1', the heat source information of the device system chip 2', and/or the heat source information of the cable 10' (i.e., the electrical interconnection 3') can be acquired. Similarly, referring to FIG. 9, the major difference from FIG. 8 is that the processor system chip 1' and the device system chip 2' are directly connected through a trace 120'. When the signal is transmitted from (the transmitter 15' of) the processor system chip 1' to (the receiver 26' of) the device system chip 2', it will pass through the packaging structure 18' of the processor system chip 1' and the multi-segment signal channel of the package structure 28' of the device system chip 2', thereby causing distortion and attenuation in signal transmission to make the signal quality worse. Similarly, by introducing external airflow AF (for example, the introduction on the left side in the figure), the flowing airflow leads the heat generated by the heat source to the heat source measurer. Therefore, the heat source information of the processor system chip 1' and/or the heat source information of the device system chip 2' can be acquired.

In summary, the system and method proposed by the present disclosure further consider the signal attenuation effect caused by thermal factors, and through full-channel thermoelectric characteristic evaluation, the impact of temperature on signal integrity can be more accurately determined so as to adjust and design the signal adjustment information (equalizer, pre-emphasis, de-emphasis, equalizer and/or retimer, repeater), or redesign the wiring to optimize the signal adjustment to ensure signal integrity and high-quality signal transmission.

What is claimed is:

1. A system for signal optimization adjustment based on different heat source information, the system comprising:
   a first system chip comprising a signal transmitter and a first heat source measurer configured to acquire heat source information of the first system chip;
   a second system chip comprising a signal receiver and a second heat source measurer configured to acquire heat source information of the second system chip, the second system chip providing an electrical characteristic state of the signal receiver for use in evaluating a signal optimization adjustment and providing signal adjustment information for at least one of the signal transmitter and the signal receiver that is associated with the electrical characteristic state based on characteristics of a signal received from the signal transmitter;
   an electrical interconnection internally connected to the first system chip and the second system chip, the electrical interconnection comprising at least one circuit board and a third heat source measurer configured to acquire heat source information of the circuit board; and
   a bit error risk evaluation computer configured to:
      make a determination, according to the heat source information of the first system chip, the heat source information of the second system chip, and the heat source information of the circuit board and corresponding temperature thresholds, whether the signal optimization adjustment is required; and
      perform the signal optimization adjustment for an electrical characteristic of the signal receiver by adjusting at least one of the signal transmitter, the signal receiver, and a signal adjuster of the electrical interconnection according to the determination and the electrical characteristic state of the signal receiver.

2. The system as claimed in claim 1, further comprising:
   at least one signal adjuster of the electrical interconnection that is adjusted according to the signal adjustment information,
   wherein an electrical characteristic of the at least one signal adjuster is adjusted to optimize the electrical characteristic of the signal receiver.

3. The system as claimed in claim 1, wherein the bit error risk evaluation computer is configured to provide a risk feedback or a risk-free feedback according to heat source information collected by the first, second, and third heat source measurers and according to corresponding limit temperature or warning temperature of the first system chip, the second system chip, and the circuit board.

4. The system as claimed in claim 1, wherein the second system chip comprises a link trainer, and the link trainer is configured to provide the electrical characteristic state of the signal receiver and the signal adjustment information for at least one of the signal transmitter and the signal receiver; and the bit error risk evaluation computer includes a function set attached to the link trainer, and is configured to transmit signal adjustment instructions to an equalizer of the first system chip, the second system chip, or a signal adjuster of the electrical interconnection.

5. The system as claimed in claim 4, wherein an additional function of the link trainer comprises an activation condition or an exclusion condition for restarting a link training between the signal transmitter and the signal receiver.

6. The system as claimed in claim 1, wherein the electrical characteristic of the signal receiver is optimally adjusted through a console on the system; wherein by restarting the system, a signal adjustment combination of the signal transmitter and the signal receiver is updated to achieve the signal optimization adjustment.

7. The system as claimed in claim 1, wherein the second system chip comprises a link trainer configured to provide the electrical characteristic state of the signal receiver and the signal adjustment information for at least one of the signal transmitter and the signal receiver, and the bit error risk evaluation computer is configured to send a signal-adjustment instruction to an equalizer of the first system chip the second system chip a signal adjuster of the electrical interconnection.

8. The system as claimed in claim 1, further comprising:
a network module connected to an external database, the external database storing a training model of the signal adjustment information,
the network module being configured to refer to training information updated in real time, and transmit adjustment instructions of an equalizer or a signal adjuster in the system.

9. The system as claimed in claim 1, further comprising:
a network module connected to a database of an external system structure combination, wherein heat source information from the first, second, and third heat source measurers are associated with a training model of the external system structure combination so as to generate processed heat source information provided to the bit error risk evaluation computer for use in performing a signal optimization adjustment for the electrical characteristic of the signal receiver according to the electrical characteristic state of the signal receiver.

10. A method for signal optimization adjustment based on different heat source information, the method comprising:
acquiring heat source information of a first system chip comprising a signal transmitter and heat source information of a second system chip comprising a signal receiver by a plurality of heat source measurers in a system;
acquiring heat source information of an electrical interconnection comprising at least one circuit board internally connected to the first system chip and the second system chip;
acquiring an electrical characteristic state of the signal receiver provided by the second system chip for use in evaluating a signal optimization adjustment, and signal adjustment information that is associated with the electrical characteristic state for at least one of the signal transmitter and the signal receiver;
evaluating the heat source information of the first system chip, the heat source information of the second system chip, and the heat source information of the circuit board to make a determination whether the signal optimization adjustment is required; and
performing the signal optimization adjustment for an electrical characteristic of the signal receiver by adjusting at least one of the signal transmitter, the signal receiver, and a signal adjuster of the electrical interconnection according to a result of the determination and the electrical characteristic state of the signal receiver.

11. The method as claimed in claim 10, further comprising:
optimizing the electrical characteristic of the signal receiver by adjusting an electrical characteristic of a signal adjuster of the circuit board based on the signal adjustment information.

12. The method as claimed in claim 10, wherein evaluating the heat source information of the first system chip, the heat source information of the second system chip, and the heat source information of the circuit board comprises:
providing a risk feedback or a risk-free feedback according to a corresponding limit or warning temperature of the first system chip, the second system chip, and the circuit board.

13. The method as claimed in claim 10, wherein the second system chip comprises a link trainer, the method further comprising:
sending a signal adjustment instruction to an equalizer of the first system chip, the second system chip, or a signal adjuster of the electrical interconnection, or activating link training between the signal transmitter and the signal receiver.

14. The method as claimed in claim 10, further comprising:
defining system structure and component information according to a geometry and material file, the system structure and component information comprising component information of the first system chip, the second system chip, and the circuit board;
initializing heating conditions of the first system chip, the second system chip, and the circuit board and heat-flow conditions of a system chassis; and
generating a mesh file or an equivalent node matrix data file.

15. The method as claimed in claim 14, further comprising:
generating a heat source analysis data file comprising heat source information of the first system chip, the second system chip, and the circuit board.

16. The method as claimed in claim 14, further comprising:
running an electrical simulation engine of a thermoelectric analysis to generate electrical characteristic states based on a thermoelectric coupling of different heat sources in individual segments so as to calculate the electrical characteristic state of the signal receiver provided by the second system chip and the signal adjustment information for at least one of the signal transmitter and the signal receiver.

17. The method as claimed in claim 15, wherein the system structure and component information further comprises one or more cables of the electrical interconnection, and the heat source analysis data file further comprises heat source information corresponding to the one or more cables.

18. The method as claimed in claim 16, wherein the thermoelectric analysis comprises electrical characteristic states of thermoelectric coupling of one or a plurality of chip package segments.

19. The method as claimed in claim 15, wherein the heat source analysis data file is generated by a finite volume method or a finite element method so that evaluation of the heat source information of the first system chip, second system chip, and the circuit board optimizes signal adjustment for the electrical characteristic of the signal receiver.

20. The method as claimed in claim 14, wherein performing the signal optimization adjustment comprises adjusting one or more impedance matches in the geometry and material file.

21. The method as claimed in claim 14, wherein performing the signal optimization adjustment comprises adjusting one or more trace lengths in the geometry and material file.

\* \* \* \* \*